United States Patent
Manabe et al.

(10) Patent No.: US 6,835,447 B2
(45) Date of Patent: Dec. 28, 2004

(54) RUBBER REINFORCING CORD AND FIBER REINFORCED RUBBER MATERIAL

(75) Inventors: Takao Manabe, Iyo-gun (JP); Haruhiko Kondo, Tama (JP); Hajime Kishi, Matsuyama (JP)

(73) Assignee: Toray Industries, Inc., Tokyo (JP)

( * ) Notice: Subject to any disclaimer, the term of this patent is extended or adjusted under 35 U.S.C. 154(b) by 42 days.

(21) Appl. No.: 09/985,551

(22) Filed: Nov. 5, 2001

(65) Prior Publication Data

US 2002/0048671 A1 Apr. 25, 2002

Related U.S. Application Data

(63) Continuation-in-part of application No. 09/736,207, filed on Dec. 15, 2001, now Pat. No. 6,500,531.

(30) Foreign Application Priority Data

Dec. 15, 1999 (JP) .............................. 11-355609
Nov. 6, 2000 (JP) ....................... 2000-337218

(51) Int. Cl.$^7$ .............................................. B32B 25/02
(52) U.S. Cl. .................... 428/295.1; 428/364; 428/367; 428/368; 428/372; 428/375; 428/378; 428/392
(58) Field of Search ................................ 428/364, 367, 428/368, 372, 375, 378, 392, 408, 295.1

(56) References Cited

U.S. PATENT DOCUMENTS

| 3,648,452 | A | * | 3/1972 | Young ......................... 57/164 |
| 3,968,198 | A | * | 7/1976 | Honda et al. ................ 264/343 |
| 4,044,540 | A | | 8/1977 | Toki et al. .................... 57/153 |
| 4,883,712 | A | | 11/1989 | Ogawa et al. ............... 428/367 |
| 4,891,267 | A | | 1/1990 | Takahashi et al. ........... 428/367 |
| 5,578,096 | A | * | 11/1996 | Christianson et al. ......... 51/295 |
| 5,624,765 | A | * | 4/1997 | Toukairin et al. ............ 428/492 |
| 5,948,503 | A | * | 9/1999 | Yamamoto et al. .......... 428/113 |
| 6,500,531 | B2 | * | 12/2002 | Manabe et al. ........... 428/295.1 |

FOREIGN PATENT DOCUMENTS

| EP | 0 902 046 A2 | 3/1999 |
| GB | 1 486 746 | 9/1977 |
| JP | 60 181369 | 9/1985 |
| JP | 63 006165 | 1/1988 |

* cited by examiner

*Primary Examiner*—Camie S. Thompson
(74) *Attorney, Agent, or Firm*—Morrison & Foerster LLP

(57) ABSTRACT

The invention provides a rubber reinforcing cord that can be suitably used as a material for reinforcing rubber materials such as tires, belts and hoses and is excellent in fatigue resistance. This invention is also a rubber reinforcing cord in which a carbon fiber bundle is impregnated with a resin composition comprising a rubber, wherein the elastic modulus of dried film of the rubber latex at 25° C. (G') is 0.4 MPa or less, and the carbon fiber bundle has a knot-breaking strength of 500 MPa or more.

20 Claims, No Drawings

RUBBER REINFORCING CORD AND FIBER REINFORCED RUBBER MATERIAL

REFERENCE TO RELATED APPLICATION

This application is a continuation-in-part of Ser. No. 09/736,207, filed Dec. 15, 2000, now U.S. Pat. No. 6,500,531.

TECHNICAL FIELD

This invention relates to a rubber reinforcing cord suitably used as a reinforcing material of various rubber materials such as tires, belt and hoses, and also to a fiber reinforced rubber material reinforced by said rubber reinforcing cord.

BACKGROUND ART

Fiber reinforced rubber materials reinforced by rubber reinforcing cords are widely used as rubber materials such as tires, belts, hoses, etc. In general, in these rubber materials, a matrix containing a rubber is reinforced by a cord obtained by coating a twisted reinforcing fiber bundle with an adhesive to form the surface layer of the bundle.

Carbon fibers have high strength and high elastic modulus and also have excellent heat resistance and water resistance, but are poor in the fatigue resistance against such large deformation as elongation and compression deformation and bending deformation. So, it has been considered that a fiber reinforced rubber material reinforced by a rubber reinforcing cord formed by carbon fibers is poor in durability.

As attempts to solve the problem, JP, 60-181369, A discloses a method of depositing a mixture consisting of an epoxy compound and a rubber latex on a carbon fiber bundle, and JP, 63-6165, A discloses a method of depositing a mixture consisting of a phenol derivative and a rubber latex on a carbon fiber bundle.

However, even these methods cannot satisfy the fatigue resistance required for such rubber materials as tires, belts and hoses, and any rubber reinforcing cord formed by carbon fibers having sufficient fatigue resistance has not been obtained yet.

SUMMARY OF THE INVENTION

To solve the above problem, this invention has the following constitution: A rubber reinforcing cord comprising a carbon fiber bundle impregnated with a resin composition comprising a rubber, wherein an elastic modulus of dried film of the rubber at 25° C. (G') is 0.4 MPa or less, said carbon fiber bundle having a knot-breaking strength of 500 MPa or more.

DETAILED DESCRIPTION OF THE INVENTION

The inventors found that a rubber reinforcing cord, characterized in that a carbon fiber bundle having a knot-breaking strength of more than a certain value is impregnated with a resin composition containing a rubber, can exhibit excellent fatigue resistance unexpectedly with high strength and high elastic modulus, to solve the above problems all at once.

In this invention, it is necessary that the knot-breaking strength of the carbon fiber bundle is 500 MPa or more. Preferable is 600 MPa or more, and more preferable is 700 MPa or more. If the knot-breaking strength is less than 500 MPa, the cord is likely to be insufficient in fatigue resistance when the rubber material is excessively deformed by an external force, and cannot be used for such applications as tires and belts.

In general, it is known that carbon fibers have high strength and high elastic modulus, but are poor in the fatigue resistance (durability) against such large deformation with friction between fibers as elongation and compression repeated deformation. The reason of the high fatigue resistance of the reinforced rubber material in this invention even using carbon fibers as reinforcing material of the cord is considered as synergistic effect of using the carbon fibers bundle whose knot-breaking strength is more than a certain value, and the soft resin including rubber covers each fiber in the bundle and that leads to prevent friction damage of the fibers.

The rubber reinforcing cord comprising the carbon fiber bundle with a resin composition comprising a rubber, said carbon fiber bundle having a knot-breaking strength of 500 MPa or more, wherein a durable life, measured according to JIS L1017, is 180 minutes or more. 250 minutes or more of the durable life is achieved in the preferable case.

In this invention, it is desirable that the elongation at break of the carbon fiber strand is 1.7% or more. Preferable is 1.8% or more, and more preferable is 1.9% or more. If the elongation at break is less than 1.7%, the cord is likely to break when the rubber material is excessively deformed by an external force, and may not be used for such applications as tires and belts.

In this invention, it is desirable that the rubber reinforcing cord is 1000 N/m or less or less in the initial gradient of the bending load-deflection curve used as an indicator of flexibility. Preferable is 900 N/m or less, and more preferable is 800 N/m. If the initial gradient is more than 1000 N/m, the cord is low in flexibility, and is likely to have stress concentration caused when the rubber material is repetitively deformed, and may become insufficient in fatigue resistance.

It is desirable that the carbon fiber strand used in this invention has a tensile strength of 4000 MPa or more. Preferable is 4400 MPa or more, and more preferable is 4800 MPa or more. If the tensile strength is less than 4000 MPa, the cord is likely to be broken when the rubber material is excessively loaded, and cannot be used for such applications as tires and belts.

It is desirable that the carbon fiber bundle used in this invention has 4000 to 20000 single fibers. A preferable range is 6000 to 18000, and a more preferable range is 8000 to 16000. If the number of single fibers is less than 4000, the reinforcing effect by the cord may become insufficient, and the dimensional stability of the rubber material may become insufficient. If more than 20000, it can happen that the cord may contain portions not impregnated with the resin composition, and that the rubber material may become insufficient in fatigue resistance.

It is desirable that the carbon fibers used in this invention is substantially circular in the cross sectional form of each single fiber. If the cross sectional form of each single fiber is not substantially circular and is of any other form such as ellipse, broad bean or three lobes, the abrasion between single fibers makes the cord likely to be broken, and the rubber material may become insufficient in fatigue resistance.

"Being substantially circular" in the above description means that the deformation degree of the section defined by ratio (=R/r) of the radius (R) of the circumscribed circle of the section of the single fiber to the radius (r) of the inscribed circle is in a range of 1 to 1.1.

In this invention, in order to prevent the breaking of the cord or the separation at the cord-rubber interface due to the abrasion between single fibers caused when the rubber material is repetitively deformed, and also in order to improve the fatigue resistance, it is necessary that the carbon fiber bundle is impregnated with a resin composition containing a rubber latex as an essential ingredient.

In general, a rubber latex has a high polymer stably dispersed in water. So, for preventing the voids that impair the fatigue resistance of the cord, it is preferable that the water contained in the cord is removed by heating and drying after the carbon fiber bundle has been impregnated with a resin composition containing a rubber latex.

It is desirable that the carbon fiber bundle used in this invention is 0.5 to 1.2 g/m in weight. A preferable range is 0.6 to 1.1 g/m, and a more preferable range is 0.7 to 1.0 g/m. If the weight of the fiber bundle is less than 0.5 g/m, the reinforcing effect by the cord may become insufficient. If the weight of the fiber bundle is more than 1.2 g/m, it can happen that the cord contains portions not impregnated with the resin composition, and that the rubber material may become insufficient in fatigue resistance.

It is desirable that the resin composition content in the cord after drying is 0.1 to 0.4 g/m in weight. A preferable range is 0.12 to 0.35 g/m, and a more preferable range is 0.14 to 0.30 g/m. If the content is less than 0.1 g/m, the impregnation of the resin composition into the center portion of the fiber bundle may become insufficient and the prevention of abrasion between single fibers may become imperfect, and the fatigue resistance of the cord may become insufficient. If more than 0.4 g/m, the reinforcing effect in the elastic modulus and the tensile strength by the cord may become insufficient, and the heat resistance, water resistance of the cord may become insufficient.

It is desirable that the resin composition content after drying is 20 to 50 wt parts based on 100 wt parts of the carbon fiber bundle. A preferable range is 25 to 45 parts, and a more preferable range is 25 to 40 parts. If the content is less than 20 parts, the impregnation of the resin composition into the center portion of the fiber bundle becomes insufficient and the prevention of abrasion between single fibers may become imperfect, and the fatigue resistance of the cord may become insufficient. If more than 50 parts, the reinforcing effect in the elastic modulus and the tensile strength by the cord may become insufficient, and the heat resistance, water resistance and solvent resistance of the cord may become insufficient.

In this invention, the elastic modulus of the dried film of the rubber latex at 25° C. (G') should be 0.4 MPa or less, preferably, 0.3 MPa or less, more preferably 0.2 MPa or less. If it is more than 0.4 MPa, the fatigue resistance of the fiber reinforced rubber material may becomes insufficient.

Examples of the rubber latex are acrylate-butadiene rubber latexes, acrylonitrile-butadiene rubber latex, isoprene rubber latex, urethane rubber latex, chloroprene rubber latex, styrene-butadiene rubber latex, natural rubber latex, and vinylpyridine-styrene-butadiene rubber latex. Among them, vinylpyridine-tyrene-butadiene rubber latex, styrene-butadiene rubber latex and acrylonitrile-butadiene rubber latex are especially effective for improving the fatigue resistance.

It is desirable that the rubber (including that of RFL) content is 40 to 80 wt % based on 100 wt % of the total resin composition after drying. A preferable range is 45 to 75 wt %, and a more preferable range is 50 to 70 wt %. If the content is less than 40 wt %, the flexibility of the cord may become insufficient, and the fatigue resistance may become insufficient. If the content is more than 80 wt %, the cord may become excessively sticky, and the handling convenience may become insufficient.

In this invention, for improving the fatigue resistance, it is preferable to add an epoxy resin and an RFL adhesive (a mixture consisting of resorcinol-formaldehyde resin and a rubber latex) to the resin composition, together with the rubber latex.

The epoxy resins that can be used here include ethylene glycol diglycidyl ether, glycerol polyglycidyl ether, trimethylolpropane polyglycidyl ether, sorbitol polyglycidyl ether, hexanediol diglycidyl ether, polyethylene glycol diglycidyl ether, polypropylene glycol diglycidyl ether and neopentyl glycol diglycidyl ether. Among them, glycerol polyglycidyl ether, sorbitol polyglycidyl ether and ethylene glycol diglycidyl ether are especially effective for improving the fatigue resistance.

It is desirable that the epoxy resin content is 20 to 80 wt % based on 100 wt % of the resin composition after drying. A preferable range is 30 to 70 wt %, and a more preferable range is 40 to 60 wt %. If the content is less than 20 wt %, the adhesiveness at the cord/rubber interface may become insufficient. If the content is more than 80 wt %, the flexibility of the cord may become insufficient, and the fatigue resistance may become insufficient. An RFL adhesive can be produced, for example, by adding resorcinol and formalin into an aqueous solution containing an alkaline compound such as sodium hydroxide, allowing the mixture to stand at room temperature for several hours, for initially condensing resorcinol and formaldehyde, and adding a latex.

It is desirable that the RFL adhesive content is 5 to 40 wt % based on 100 wt % of the resin composition after drying. A preferable range is 8 to 30 wt %, and a more preferable range is 10 to 20 wt %. If the content is less than 5 wt %, the adhesiveness at the cord/rubber interface may become insufficient. If the content is more than 40 wt %, the flexibility of the cord may become insufficient, and the fatigue resistance may become insufficient.

In the fiber reinforced rubber material of this invention, a matrix containing a rubber is reinforced with said rubber reinforcing cord.

The rubbers that can be contained in the matrix include acrylic rubber, acrylonitrile-butadiene rubber, isoprene rubber, urethane rubber, ethylene-propylene rubber, epichlorohydrin rubber, chlorosulfonated polyethylene rubber, chloroprene rubber, silicone rubber, styrene-butadiene rubber, polysulfide rubber, natural rubber, butadiene rubber, butyl rubber and fluorine rubber.

The matrix can contain, as required, an inorganic filler such as carbon black or silica, organic filler such as coumarone resin or phenol resin, and softener such as naphthenic oil, in addition to the rubber contained as a main ingredient.

The rubber reinforcing cord of this invention can be produced, for example, as described below. That is, the carbon fiber bundle is passed through a treating solution tank containing rubber latexes and epoxy resin and then a treating solution tank containing an RFL adhesive, and further through a heating and drying furnace, to remove the water in the cord. It is desirable for the cord that an RFL adhesive is localized on the resin composition comprising epoxy resins and rubber in order to achieve the good fatigue resistance and adhesion strength to rubber materials.

The fiber reinforced rubber material of this invention can be produced, for example, as described below. That is, cords paralleled in the same direction are held on both sides between matrix sheets mainly containing a rubber, and the cord/rubber composite is heated and pressed in a press, to vulcanize the rubber for forming.

The fiber reinforced rubber matrix of this invention can be used for any of tires, belts and hoses, but is especially suitable for tires. In general, a tire consists of a tread portion and side wall portions respectively made of a rubber, and a belt portion, carcass portion and bead portion respectively made from cords and a rubber. The fiber reinforced rubber material of this invention can be used in any of the belt portion, carcass portion and bead portion, but is especially suitable for the belt portion.

The methods for evaluating the carbon fiber bundle and the rubber reinforcing cord of this invention are as follows.

<Knot-Breaking Strength of Carbon Fiber Bundle>

Test specimens for evaluation of the breaking strength of a carbon fiber bundle with a knot was prepared according to the methods described in JIS L1013-1981 and the tensile breaking strength was measured in the following conditions and the average strength was calculated.

Each specimen had a simple single knot formed nearly in the middle of the carbon fiber bundle according to the methods described in JIS L1013-1981. The specimen was placed in the clamps of a tensile testing machine. The gauge length between the clamps was 250 mm. The knot formed in the bundle should be in the middle portion between the clamps. After tightening the clamps, the specimen was loaded at a tensile speed of 50 mm/minute under the circumstance of 25° C. and 40% RH, and the breaking maximum load was measured.

The knot-breaking strength was defined as the value of the maximum load divided by the calculated cross-sectional area of the carbon fibers bundle. The cross-sectional area was calculated as the value of the bundle weight (g/m) divided by the density (g/cm$^3$) of the carbon fibers.

10 specimens for each experimental lot were evaluated and the average strength was calculated.

<Elongation at Break and Tensile Strength of Carbon Fiber Strand>

Measured according to the methods described in JIS R 7601 (corresponding to ASTM D1423-59T). In this case, the carbon fiber bundle was impregnated with a resin of the following composition, and heated until cured at 130° C. for 35 minutes, to make tensile test pieces.

Resin composition: 3,4-epoxycylohexylmethyl-3,4-epoxy-cyclohexane-carboxylate (100 parts by weight)/boron trifluoride monoethylamine (3 parts by weight)/acetone (4 parts by weight)

<Sectional Form of Single Fibers of Carbon Fiber Bundle>

The carbon fiber bundle was cut in the direction perpendicular to the fiber direction using a razor, and the section of a single fiber was photographed using a scanning electron microscope at 10,000 times at an accelerating voltage of 15 kV. On the sectional photo, a circumscribed circle and an inscribed circle were respectively drawn, and with the radius of the circumscribed circle as R and the radius of the inscribed circle as r, when the sectional deformation degree defined by the ratio (=R/r) was in a range of 1 to 1.1, it was judged that the sectional form of the single fiber was substantially circular.

<Elastic Modulus of Dried Film of Rubber Latex (G')>

The rubber latex is dried at 140° C. for 30 minutes and the elastic modulus of the dried film was measured by viscoelasticity tester. Viscoelasticity mesurement system expanded type "ARES" (manufactured by Rheometric Scientific Co.) was used.

Measuring method: The atmosphere was adjusted to 25° C. and the film was sandwiched by two aluminum circular plates of 16 mm diameter and reciprocally rotated at a cycle of 3.14 rad/sec. The torque loaded to the circular plates was detected and converted to the elastic modulus.

<Initial Gradient of Stress-Strain Curve of Rubber Reinforcing Cord>

Measured according to the method described in ASTM D 885-76. The rubber reinforcing cord was cut at a length of 1 m, and a metallic hook was fastened at one end while a 300 g weight was fastened at the other end. It was suspended in air for 72 hours, to be vertical, for obtaining a sample.

The sample was cut at a length of 2 cm, and the cut piece was placed on a jig at a span of 1 cm. A metallic hook was hooked at the center of the span, and was lowered at a speed of 2 cm/min in an environment of 25° C. and 40% relative humidity, to obtain a bending curve-deflection curve. The gradient of the tangent was extrapolated to load 0 and was defined as the initial gradient of bending load-deflection curve.

<Fatigue Resistance of Rubber Reinforcing Cord>

Measured according to the method described in JIS L 1017 (corresponding to ASTM D885-76). A rubber sheet was wound around a drum, and said rubber reinforcing cord was wound around it at intervals of 55 lines/10 cm. Furthermore, another identical rubber sheet was wound around it, and the three-layer rubber sheet/cord/rubber sheet laminate thus obtained was removed from the drum and placed around a mandrel, as a tube.

Furthermore, it was pressed in a press to vulcanize and form the rubber, for obtaining a fiber reinforced rubber material in which the axial direction of the rubber tube agreed with the direction of the cord (27 mm in outer diameter, 13 mm in inner diameter and 24 cm in length).

The fiber reinforced rubber material was bent by 90° at the center, and air with a pressure of 0.3 MPa was fed into the tube, while both the ends of the tube were revolved at a speed of 850 rpm in the same direction in a 25° C. atmosphere. The time taken till the tube was broken was used as the indicator of fatigue resistance. As can be seen from the results shown in Table 5, the rubber reinforcing cords of this invention are excellent in fatigue resistance.

Rubber sheet composition: Isoprene rubber (70 parts by weight)/butadiene rubber (30 parts by weight)/sulfur (2 parts by weight)/zinc oxide (5 parts by weight)/stearic acid (2 parts by weight)/ dibenzothiazyl disulfide (1 part by weight)/ carbon black (60 parts by weight)

EXAMPLES 1 THROUGH 8 AND COMPARATIVE EXAMPLES 1 THROUGH 8

This invention is described below more particularly.

In the following examples and comparative examples, the following raw materials were used to prepare rubber reinforcing cords and fiber reinforced rubber materials. The resin compositions impregnated into the carbon fiber bundles are shown in Table 1, and the results of evaluating the fatigue resistance of the rubber reinforcing cords are shown in Table 2.

1. Raw Materials
(1) Carbon Fiber Bundles (a) "T300B-12K-50B" (trade No., produced by Toray Industries, Inc.), elongation at break 1.5%, tensile strength 3500 MPa, knot-breaking strength 270 MPa, sectional deformation degree of single fiber 1.25, fiber content 0.80 g/m.

(b) "T700S-12K-50C" (trade No., produced by Toray Industries, Inc.), elongation at break 2.1%, tensile strength 4900 MPa, knot-breaking strength 750 MPa, sectional deformation degree of single fiber 1.05, fiber content 0.80 g/m.

(c) "T800H-12K-40B" (trade No., produced by Toray Industries, Inc.), elongation at break 1.9%, tensile strength 5500 MPa, knot-breaking strength 280 MPa, sectional deformation degree of single fiber 1.37, fiber content 0.44 g/m.

(2) Rubber Latexes (a) Vinylpyridine-styrene-butadiene rubber latex: JSR0652 (trade No., produced by JSR K.K.), solid content 40 wt %, elastic modulus of dried film (G') 0.11 MPa (25° C.)
(b) Styrene-butadiene rubber latex: JSR2108 (trade No., produced by JSR K.K.), solid content 40 wt %, elastic modulus of dried film (G') 0.11 MPa (25° C.)
(c) Acrylonitrile-butadiene rubber latex: "Nippol" LX513 (registered trade name, produced by Nippon Zeon Co., Ltd.), solid content 45 wt %, elastic modulus of dried film (G') 0.47 MPa (25° C.)
(d) Butadiene rubber latex: "Nippol" LX111F (registered trade mark, produced by Nippon Zeon Co., Ltd.), solid content 55 wt %, elastic modulus of dried film (G') 0.46 MPa (25° C.)

(3) Epoxy Resins (a) Ethylene glycol diglycidyl ether: "Epolite" 40E (registered trade mark, produced by Kyoei Kagaku K.K.), epoxy equivalent 130
(b) Polyethylene glycol diglycidyl ether: "Epolite" 400E (registered trade mark, Kyoei Kagaku K.K.), epoxy equivalent 290

2. Preparation and Evaluation

A carbon fiber bundle was carried at a speed of 10 m/min and passed through a treating solution tank containing a rubber latex and an epoxy resin and then a treating solution tank containing an RFL adhesive, and further passed through a heating and drying furnace of 150° C., to remove the water contained in the treating solutions, for obtaining a rubber reinforcing cord. The dried resin was composed as shown in Table 1, and the total resin content was 30 parts based on 100 parts of the carbon fiber bundle (The rubber/epoxy resin content and the RFL adhesive content after drying were respectively 25 parts and 5 parts based on 100 parts of the carbon fiber bundle).

TABLE 1

Resin compositions

| | | Elastic modulus (MPa) | Composition (parts by weight after drying) | | | | | | | |
|---|---|---|---|---|---|---|---|---|---|---|
| | | | 1 | 2 | 3 | 4 | 5 | 6 | 7 | 8 |
| Rubber latex | JSR0652 | 0.11 | 44 | 22 | 22 | 32 | 20 | 20 | 10 | 10 |
| | JSR2108 | 0.11 | — | 22 | 22 | — | — | — | — | — |
| | LX513 | 0.47 | — | — | — | — | 24 | — | 22 | — |
| | LX111F | 0.46 | — | — | — | — | — | 24 | — | 22 |
| Epoxy resin | 40E | — | 22 | 22 | 44 | 44 | 14 | 14 | 44 | 44 |
| | 400E | — | 22 | 22 | — | — | 30 | 30 | — | — |
| RFL | Resorcinol | — | 10 | 10 | 10 | 20 | 10 | 10 | 20 | 20 |
| | Formaldehyde | — | 2 | 2 | 2 | 4 | 2 | 2 | 4 | 4 |

The initial gradient of load-deflection curve of the rubber reinforcing cord was measured according to the above-described method. In addition, tubular test pieces of the fiber reinforced rubber material were also made according to the above-described method and the durable lives were determined. As shown in Table 2, the fiber reinforcing cord of this invention is excellent in fatigue resistance.

TABLE 2

Fatigue resistance of rubber reinforcing cords

| | | Carbon fibers | | | Impregnating resin composition | Initial gradient (N/m) | Durable life (mm) |
|---|---|---|---|---|---|---|---|
| | | Type | Breaking extension (%) | Knot-breaking Strength (MPa) | | | |
| Example | 1 | T700S | 2.1 | 750 | 1 | 730 | 312 |
| | 2 | T700S | 2.1 | 750 | 2 | 750 | 294 |
| | 3 | T700S | 2.1 | 750 | 3 | 870 | 283 |
| | 4 | T700S | 2.1 | 750 | 4 | 960 | 271 |
| | 5 | T700S | 2.1 | 750 | 5 | 1090 | 239 |
| | 6 | T700S | 2.1 | 750 | 6 | 1020 | 238 |
| | 7 | T700S | 2.1 | 750 | 7 | 1150 | 215 |
| | 8 | T700S | 2.1 | 750 | 8 | 1170 | 206 |
| Comparative Example | 1 | T300B | 1.5 | 270 | 1 | 750 | 39 |
| | 2 | T300B | 1.5 | 270 | 2 | 770 | 37 |
| | 3 | T300B | 1.5 | 270 | 3 | 880 | 25 |
| | 4 | T300B | 1.5 | 270 | 4 | 960 | 15 |
| | 5 | T800H | 1.9 | 280 | 1 | 750 | 148 |
| | 6 | T800H | 1.9 | 280 | 2 | 760 | 140 |
| | 7 | T800H | 1.9 | 280 | 3 | 890 | 126 |
| | 8 | T800H | 1.9 | 280 | 4 | 990 | 102 |

EXAMPLES 9 THROUGH 12 AND COMPARATIVE EXAMPLES 9 THROUGH 16

This invention is described below more particularly.

In the examples and comparative examples, the following raw materials were used to prepare rubber reinforcing cords and fiber reinforced rubber materials.

1. Raw Materials (1) Carbon Fiber Bundles

Same as those used in Example 1.

(2) Rubber Latexes (a) Vinylpyridine-styrene-butadiene rubber latex: "Nippol" 2518FS (registered trade mark, produced by Nippon Zeon Co., Ltd.), solid content 40.5%, elastic modulus of the dried film of the rubber latex (G') 0.11 MPa (25° C.)

(b) Styrene-butadiene rubber latex: "Nippol" LX110 (registered trade mark, produced by Nippon Zeon Co., Ltd.), solid content 40.5%, elastic modulus of dried film of the rubber latex (G') 0.11 MPa (25° C.)

(3) Epoxy Resins (a) Glycerol polyglycidyl ether: "Denacole" EX-313 (registered trade mark, produced by Nagase Chemicals Ltd.), epoxy equivalent 141

(b) Sorbitol polyglycidyl ether: "Denacole" EX-614 (registered trade mark, produced by Nagase Chemicals Ltd.), epoxy equivalent 167

2. Preparation and Evaluation

A carbon fiber bundle was carried at a speed of 10 m/min, and passed through a treating solution tank containing 1st resin (a rubber latex/epoxy resin) composed as shown in Table 3, and then a treating solution tank 2nd resin containing an RFL adhesive composed as shown in Table 4. Furthermore, it was passed through a 150° C. heating furnace, to remove the water contained in the treating solutions, for obtaining a rubber reinforcing cord. The total resin content in the cord was shown in Table 5. The weight ratio of 1st resin to 2nd resin was 5:1.

Tubular test pieces of the fiber reinforced rubber material were made according to the above-described method and the durable lives were determined.

The resin compositions impregnated into the carbon fiber bundles are shown in Tables 3 and 4, and the results of evaluating the fatigue resistance of rubber reinforcing cords are shown in Table 5. As shown in Table 5, the fiber reinforcing cord of this invention is excellent in fatigue resistance.

TABLE 3

Composition of treating solution (30 wt % aqueous solution)

| | Before drying (parts by weight) | After drying (parts by weight) |
|---|---|---|
| Nippol 2518FS | 185.2 | 75.0 |
| Nippol LX110 | 185.2 | 75.0 |
| Denacole EX-313 | 75.0 | 75.0 |
| Denacole EX-614 | 75.0 | 75.0 |
| Water (ion exchange water) | 479.6 | — |
| Total | 1000.0 | 300.0 |

TABLE 4

Composition of treating solution (35 wt % aqueous solution)

| | Before drying (parts by weight) | After drying (parts by weight) |
|---|---|---|
| Resorcinol | 85.0 | 85.0 |
| Formalin | 41.0 | 15.2 |
| Nippol 2518FS | 494.8 | 200.4 |
| Nippol LX110 | 123.5 | 50.0 |
| Water (ion exchange water) | 255.7 | — |
| Total | 1000.0 | 350.6 |

TABLE 5

Fatigue resistance evaluation results of rubber reinforcing cords

| | Carbon fibers | | | | |
|---|---|---|---|---|---|
| | Type | Breaking Extension (%) | Knot-breaking Strength (MPa) | The amount of total resin (g/m) | Durable time (min) |
| Example | | | | | |
| 9 | T700S | 2.1 | 750 | 0.31 | 325 |
| 10 | T700S | 2.1 | 750 | 0.24 | 292 |
| 11 | T700S | 2.1 | 750 | 0.21 | 255 |
| 12 | T700S | 2.1 | 750 | 0.16 | 210 |
| Comparative Example | | | | | |
| 9 | T800H | 1.9 | 280 | 0.25 | 155 |
| 10 | T800H | 1.9 | 280 | 0.21 | 144 |
| 11 | T800H | 1.9 | 280 | 0.16 | 135 |
| 12 | T800H | 1.9 | 280 | 0.09 | 107 |
| 13 | T300 | 1.5 | 270 | 0.31 | 82 |
| 14 | T300 | 1.5 | 270 | 0.25 | 58 |
| 15 | T300 | 1.5 | 270 | 0.19 | 46 |
| 16 | T300 | 1.5 | 270 | 0.16 | 24 |

What is claimed is:

1. A rubber reinforcing cord comprising a carbon fiber bundle impregnated with a resin composition comprising a rubber, wherein an elastic modulus of dried film of the rubber at 25° C. (G') is 0.4 MPa or less, said carbon fiber bundle having a knot-breaking strength of 500 MPa or more.

2. A rubber reinforcing cord according to claim 1, wherein a tensile strength of the carbon fiber bundle is 4000 MPa or more.

3. A rubber reinforcing cord according to claim 1, wherein the carbon fiber bundle is 4000 to 20000 single fibers.

4. A rubber reinforcing cord according to claim 1, wherein a sectional form of the single fibers of the carbon fiber bundle is substantially circular.

5. A rubber reinforcing cord according to claim 1, wherein an amount of the resin composition is 20 to 50 parts by weight based on 100 parts by weight of the carbon fiber bundle.

6. A rubber reinforcing cord according to claim 1, wherein an amount of the resin composition is the cord after drying is 0.1 to 0.4 grams per meter of cord length.

7. A rubber reinforcing cord according to claim 1, wherein an amount of the rubber is 40 to 80 wt % based on 100 wt % of the resin composition.

8. A rubber reinforcing cord according to claim 1, wherein an epoxy resin is present at an amount of 20 to 80 wt % based on 100 wt % of the resin composition.

9. A rubber reinforcing cord according to claim 1, wherein the rubber comprises at least one rubber selected from the group consisting of vinylpyridine-styrene-butadiene rubber, styrene-butadiene rubber and acrylonitrile-butadiene rubber.

10. A rubber reinforcing cord according to claim 1, wherein the resin composition comprises at least one epoxy resin selected from a group consisting of glycerol polyglycidyl ether, sorbitol polyglycidyl ether and ethylene glycol diglycidyl ether.

11. A rubber reinforcing cord according claim 1, wherein an adhesive made of a mixture consisting of resorcinol-formaldehyde resin and a rubber latex is present and localized on the resin composition comprising the rubber.

12. A fiber reinforced rubber material, comprising a matrix comprising a rubber reinforced by the rubber reinforcing cord according to claim 1.

13. A rubber reinforcing cord comprising a carbon fiber bundle and a resin composition comprising a rubber, wherein an elastic modulus of a dried film of the rubber at 25° C. (G') is 0.4 MPa or less, said carbon fiber bundle has a knot-breaking strength of 500 MPa or more, and a durable life of the rubber reinforcing cord, measured according to JIS L1017, is 180 minutes or more.

14. A rubber reinforcing cord according to claim 11, wherein the adhesive content is 5 to 40 wt % based on 100 wt % of the resin composition after drying.

15. A rubber reinforcing cord according to claim 14, wherein the adhesive content is 8 to 30 wt %.

16. A rubber reinforcing cord according to claim 14, wherein the adhesive content is 10 to 20 wt %.

17. A rubber reinforcing cord according to claim 6, wherein an amount of the resin composition in the cord after drying is 0.12 to 0.35 grams per meter of cord length.

18. A rubber reinforcing cord according to claim 6, wherein an amount of the resin composition in the cord after drying is 0.14 to 0.30 grams per meter of cord length.

19. A rubber reinforcing cord according to claim 1, wherein the rubber is a latex-containing rubber.

20. A rubber reinforcing cord comprising a carbon fiber bundle impregnated with a resin composition comprising a rubber, wherein an elastic modulus of dried film of the rubber at 25° C. (G') is 0.4 MPa or less, said carbon fiber bundle having a knot-breaking strength of 500 MPa or more, wherein the rubber comprises at least one rubber selected from the group consisting of vinylpyridine-styrene-butadiene rubber, styrene-butadiene rubber and acrylonitrile-butadiene rubber, further wherein the rubber is a latex-containing rubber.

* * * * *